(12) United States Patent
Debalme et al.

(10) Patent No.: US 6,604,761 B1
(45) Date of Patent: Aug. 12, 2003

(54) COUPLING DEVICE FOR TWO PIPES MADE OF COMPOSITE MATERIAL BASED ON A THERMOPLASTIC

(75) Inventors: Jean-Paul Debalme, Chambery; Gerard Gandre, Pesmes, both of (FR)

(73) Assignee: Saint-Gobain Vetrotex France S.A., Chambery (FR)

(*) Notice: Subject to any disclaimer, the term of this patent is extended or adjusted under 35 U.S.C. 154(b) by 110 days.

(21) Appl. No.: 09/678,973

(22) Filed: Oct. 5, 2000

(30) Foreign Application Priority Data

Jan. 5, 2000 (FR) .............................. 00 00073

(51) Int. Cl.[7] .............................................. F16L 19/00
(52) U.S. Cl. ........................... 285/353; 285/55; 285/93; 285/355; 285/423
(58) Field of Search ........................ 285/353, 222.4, 285/222.2, 55, 423, 21.2, 21.3, 21.1, 333, 355, 383, 331, 93

(56) References Cited

U.S. PATENT DOCUMENTS

| | | | | |
|---|---|---|---|---|
| 2,029,798 A | * | 2/1936 | Schellin ........................ 285/93 |
| 3,462,175 A | * | 8/1969 | Johnson ................... 285/423 X |
| 3,711,126 A | * | 1/1973 | Hara et al. ............... 285/356 X |
| 3,784,239 A | * | 1/1974 | Carter et al. ............. 285/423 X |
| 4,014,568 A | * | 3/1977 | Carter et al. ............. 285/423 X |
| 4,035,002 A | * | 7/1977 | Curtin ..................... 285/423 X |
| 4,366,971 A | * | 1/1983 | Lula ............................ 285/55 |
| 4,537,426 A | * | 8/1985 | Carter, Sr. .............. 285/353 X |
| 4,565,393 A | * | 1/1986 | Greaves .................. 285/353 X |
| 5,028,081 A | * | 7/1991 | Fournier ................. 285/353 X |
| 5,566,986 A | * | 10/1996 | Allen et al. ................... 285/55 |
| 5,794,985 A | * | 8/1998 | Mallis ......................... 285/93 |

* cited by examiner

*Primary Examiner*—Lynne H. Browne
*Assistant Examiner*—David E. Bochna
(74) *Attorney, Agent, or Firm*—Oblon, Spivak, McClelland, Maier & Neustadt, P.C.

(57) ABSTRACT

A device for coupling two pipes made of composite material based on a reinforced thermoplastic, includes a sleeve (40) threaded on its internal wall and intended to be joined to an end (21) of the first pipe (20) and to an end (31) of the second pipe (30). A sealing element (44) creates a seal in the coupling zone. A first end-piece (11) is intended to be fastened to the end (21) of the first pipe and a second end-piece (12) is intended to be fastened to the end (31) of the second pipe. Each end-piece has over at least part of its external surface (13, 14) a screw thread (15, 16) intended to engage in a complementary manner with the screw thread (48) of the sleeve (40).

16 Claims, 3 Drawing Sheets

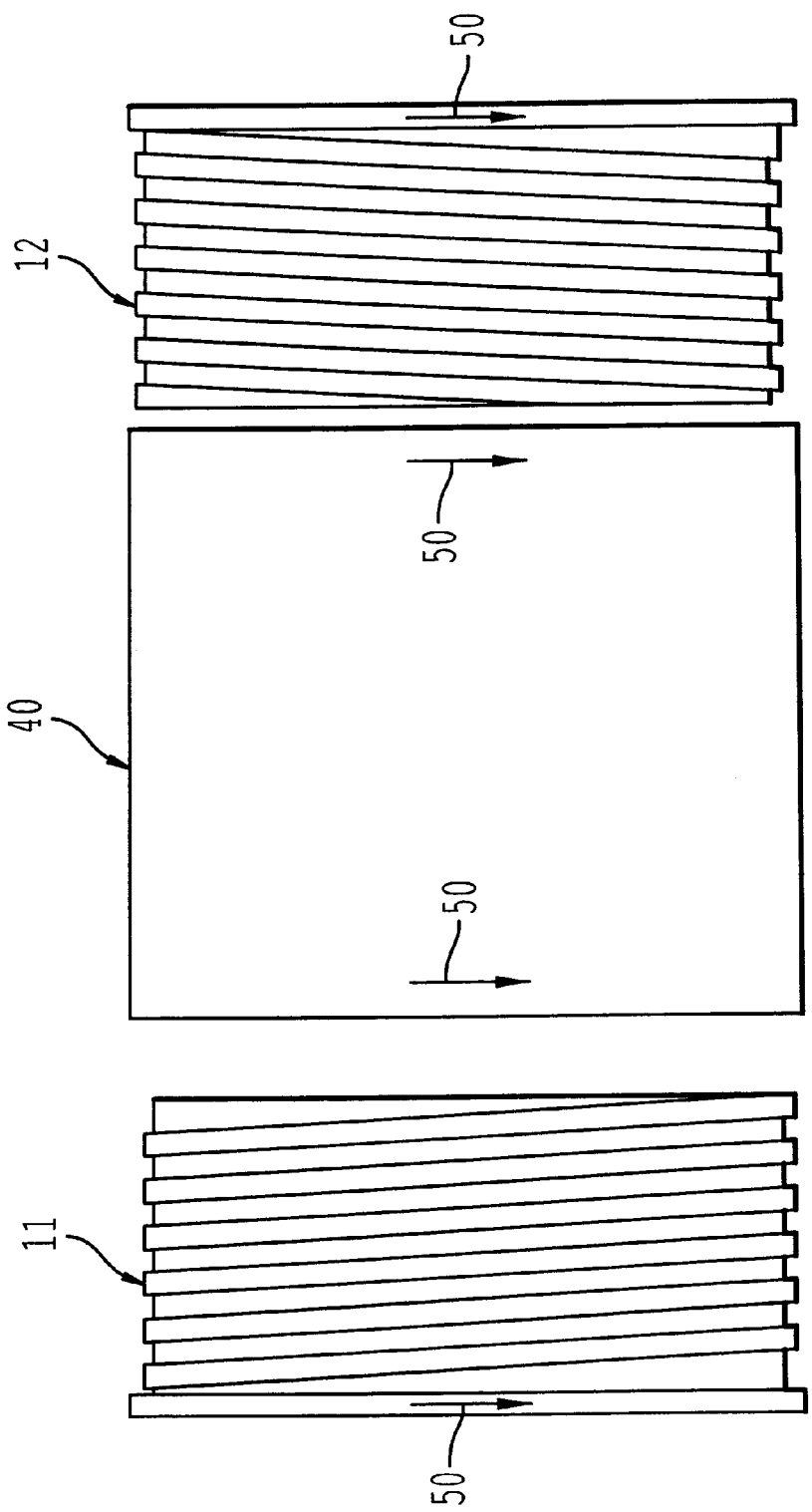

COUPLING DEVICE FOR TWO PIPES MADE OF COMPOSITE MATERIAL BASED ON A THERMOPLASTIC

The present application is based on French patent application 0000073, filed on Jan. 5, 2000, which is herein incorporated by reference.

BACKGROUND OF THE INVENTION

1. Field of the Invention

The present invention relates to the coupling of pipes made of a composite material comprising reinforcing fibers and thermoplastic.

2. Description of the Related Art

Such pipes, used especially for conveying pressurized fluids, are generally preferred to cast iron or cement pipes because of their much lesser weight, which consequently means that they are easier to handle in the field.

In any installation, it is necessary to ensure continuity of the pipes by use of a sealed coupler able to withstand stresses effectively. Patent Application FR 2,728,051 discloses a coupling device for connecting one end of a composite pipe based on a reinforced thermoplastic to one end of another composite pipe. This device comprises a coupling sleeve and an annular sealing member placed inside the coupling sleeve, the sleeve being provided on its internal wall with a screw thread intended to engage with complementary screw threads in the thickness and on the external surface of the ends of the two tubes to be coupled. According to this device, the screw thread of the coupling sleeve extends over a minimum length which depends on the diameter of the yarns constituting the reinforcing material for the pipes, so as to obtain a pull-out strength greater than the tensile strength of the reinforcing material.

One of the drawbacks of this coupling device relates to the screw thread made in the thickness of the pipes, at their ends. This is because, in the field, when adapting the lengths of the pipes and, for example, cutting a pipe in order to shorten it, part of the screw thread, or even all of it, is necessarily lost. So after cutting, another screw thread is difficult to produce in the field.

Moreover, the coupling device in the above application engages directly with screw threads provided on the ends of the pipes and made directly in the thickness of these pipes, thereby requiring the manufacture of pipes whose thickness is great enough to be able to incorporate the screw thread. This added thickness is useful only at the ends of the pipes bearing the screw threads, but is present over the entire length of the pipe since the end screw threads are formed only after the entire body of the pipes has been manufactured. It is therefore necessary to provide additional material for the manufacture of such pipes, which significantly increases the raw-material cost and the final weight of the pipe.

SUMMARY OF THE INVENTION

It is an object of the invention to provide a coupling device for composite pipes which is easy to assemble both in the factory and in the field and which does not increase the manufacturing cost of the composite pipes and consequently the cost of an installation, while still ensuring satisfactory strength and sealing of the pipes in the coupling zone.

According to the invention, the above and other objects are addressed by a device for coupling two pipes made of composite material based on a reinforced thermoplastic. The device comprises a sleeve intended to be joined, on one side, to an end of the first pipe and, on the other side, to an end of the second pipe, the sleeve being provided on its internal wall with at least one screw thread. A sealing element creates a seal in the coupling zone, and comprises a first end-piece intended to be fastened to the end of the first pipe and a second end-piece intended to be fastened to the end of the second pipe, each end-piece having over at least part of its external surface a screw thread intended to engage in a complementary manner with the screw thread of the sleeve.

The use of separate threaded end-pieces thus avoids increasing the thickness of the external jacket of the pipe over its entire length.

The two pipes may consist of a thermoplastic matrix, a layer of reinforced material coating the matrix, and a thermoplastic jacket covering the coating layer. At least the internal surface of the end-pieces is made of the same thermoplastic as that of the jacket of the pipes.

This identical material advantageously makes it possible to attach the end-pieces, after they have been heated, around the ends of the two pipes, these ends also being heated, in order to weld them together, after which they are cooled to consolidate them.

This way of fastening the end-pieces by welding, may thus be carried out both in the factory and in the field, something which is advantageous when the length of a pipe must be adapted in the field by cutting it. The end-pieces are adapted and easily attached in the field.

Advantageously, the length of the end-pieces is between 0.5 and 2 times the diameter of the pipes which are of cylindrical shape.

Preferably, the coating layer of the pipes and the external layer of the sleeve are based on a raw material consisting of comingled glass filaments and thermoplastic filaments, the thickness of the external layer of the sleeve being at least equal to that of the coating layer of the pipes.

According to another characteristic, the sleeve has on its internal wall two screw threads formed with opposite hands and located on either side of a mid-plane transverse to the longitudinal axis of the body of the sleeve, the two screw threads being intended to engage with the respective screw threads of the two end-pieces, the hand of the screw threads being matched to the hand of each screw thread of the sleeve. Moreover, indicia are provided on the end-pieces and on the sleeve for identifying the hand of the screw thread.

Advantageously, the screw thread or threads of the sleeve are formed of the same material as that of the screw threads of the end-pieces.

According to another characteristic, the sleeve includes, at its mid-plane, a groove intended to accommodate the sealing element against which the ends of the pipes provided with the end-pieces are intended to be pressed. Advantageously, the sealing element is sufficiently flexible to intimately follow the shape of the free cross sections of the ends of the pipes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a side view of end-pieces and a sleeve according to the present invention, which have indicia thereon to indicate an threaded engaging direction or "hand" thereof.

DETAILED DESCRIPTION OF THE PREFERRED EMBODIMENT

Figure 1:
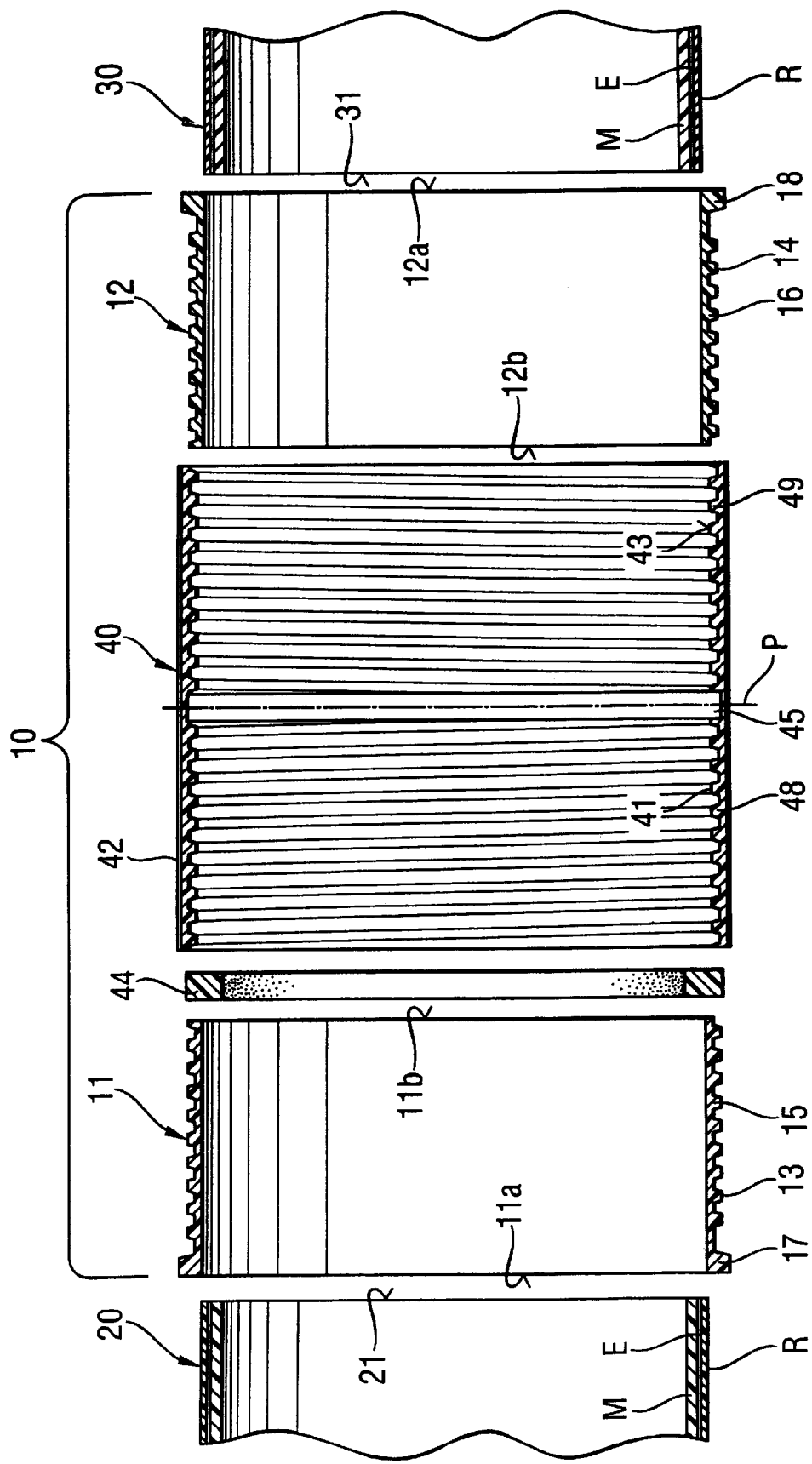
FIG. 1 is an exploded sectional view of the coupling device of the invention, intended for joining two ends of the pipe.
Figure 2:
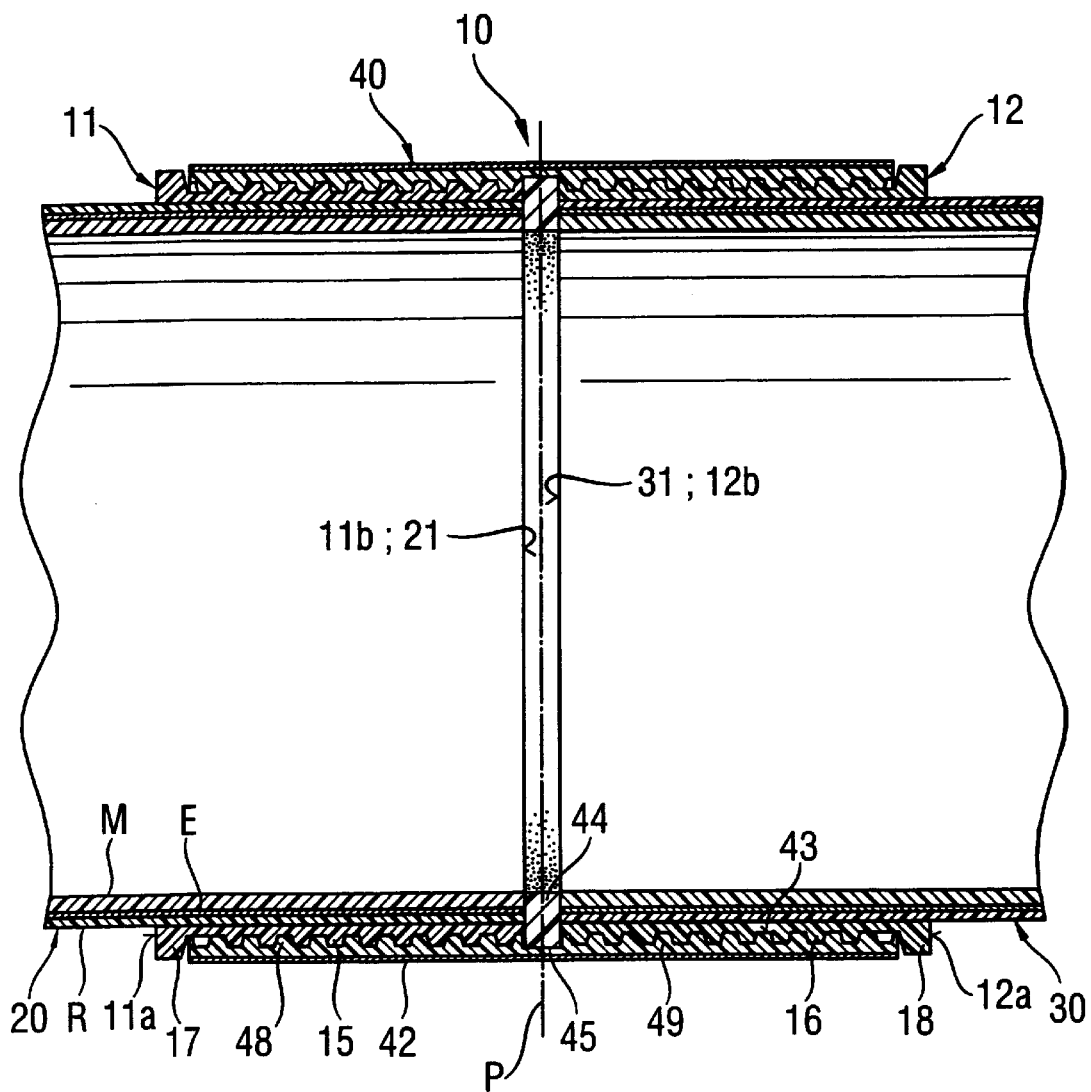
FIG. 2 is a sectional view of the coupling device joined to two ends of the pipes.

The non-limiting coupling device 10 illustrated in FIG. 1 has the purpose of joining two cylindrical pipes 20 and 30 made of a composite material based on a reinforced thermoplastic.

In particular, each pipe includes a thermoplastic matrix M, for example a polyethylene matrix, of a reinforcing coating layer E surrounding the matrix M and of a thermoplastic jacket R covering the coating layer, this preferably being identical to the material of the matrix M. Advantageously, the coating layer E is made of a thermoplastic, for example polyethylene, in which continuous glass yarns are embedded, the raw material for this layer being advantageously TWINTEX® sold by Vetrotex in the form of a composite yarn consisting of comingled thermoplastic filaments and glass filaments. The construction of such pipes is described, for instance, in French Patent Application FR 98/13293.

The pipes 20 and 30 have an end 21 and an end 31, respectively, these ends being of identical cross section and not intended to be butted together.

The coupling device 10 comprises two hollow end-pieces 11 and 12, each intended to be fastened around the respective ends 21 and 31 of the pipes, and a sleeve 40 intended to connect the two pipes by combining with the end-pieces 11 and 12. The coupling devices 10 according to the invention are manufactured in the factory with automated means suitable for reducing costs and for ensuring their precision.

Each end-piece 11, 12 is made of a thermoplastic, preferably one identical to that of the jacket R of the pipes. This is because the method of fastening the end pieces to the pipes, by drawing-welding, facilitates the joining process and ensures better mechanical integrity of the assembly.

The end-pieces 11 and 12 have, on their external surfaces 13 and 14 respectively, screw threads 15 and 16 over at least part of their lengths equivalent to a half-length of the sleeve 40.

Each end-piece 11, 12 has an end 11a, 12a respectively, for engagement of the end-piece around the pipe, and an opposite end 11b, 12b respectively, for abutment. In order to withstand the compressive forces due to the fluid flowing in the pipes, the length of the end-pieces 11 and 12 is preferably between 0.5 and 2 times the diameter of the pipes 20 and 30.

Optionally, the engagement ends 11a and 12a may have respective external flanges 17 and 18 which thus project from the screw threads 15, 16 so as to serve as elements for protecting the screw threads while the threaded end-pieces and/or the pipes provided with the threaded end-pieces are being handled in the field. However, in order to simplify manufacture, it may be preferred not to add the flanges 17, 18; the end pieces 10 may arrive in the field provided with a protective shell surrounding the screw threads.

The sleeve 40 consists of an internal layer 41 made of a thermoplastic, such as that of the polyethylene end-pieces, and of an external layer 42 for coating the internal layer, made of a reinforcing composite material such as TWINTEX® in order to withstand the compressive forces applied during use. The layer 42 has a thickness at least equal to that of the coating layer E, made of reinforcing composite material, of the pipes in order to ensure continuity of pressure resistance between the pipes and the end-pieces. Preferably, a protection layer, not shown, is provided for covering the external layer 42, made of a thermoplastic for example.

The sleeve includes, on its internal wall 43, in the thickness of the internal layer 41, a screw thread 48 and a screw thread 49, respectively, these screw threads extending axially over the body of the sleeve and on either side of a mid-plane P transverse to the longitudinal axis of the body, and advantageously having opposite senses (hands). The screw threads 48 and 49 are intended to engage, respectively, with the screw threads 15 and 16 of the end-pieces.

Of course, since the screw threads 48, 49 are of opposite hands, the screw threads 15 and 16 of the end-pieces also have opposite hands, but each is of the same hand as that screw thread of the sleeve for which it is intended. It goes without saying that, in the case of pipes delivered to the field already equipped with the end-pieces, the end of each end-piece has a thread of opposite hand. As depicted in FIG. 3, in order to make the coupling operation quick, indicia 50 are provided both on the end-pieces and on each threaded side of the sleeve for identifying the hand, for example an inscription or a label.

Finally, a sealing element 44 for sealing the coupling between the two pipes 20 and 30 are provided, the sealing element having to be inert with respect to the fluid flowing in the pipes.

The sealing element is thus located, once the coupling has taken place, in the coupling zone at the mid-plane P of the sleeve 40. Because of possible irregularity in the free cross sections of the ends 21 and 31 of the pipes, which may sometimes be re-cut in the field, the sealing element must be flexible enough to perfectly follow the shape of the free cross sections so as to guarantee complete sealing.

The sealing element may consist of a semi-rigid central seal which is fitted into an annular housing groove 45 made in the internal surface 41 of the sleeve in the mid-plane P, the seal having its lateral faces projecting from the screw threads 48 and 49, which faces are intended to be compressed by the free ends 21 and 31 of the two pipes. As a variant, a rigid thermoplastic washer may be provided instead, the washer being inserted in the annular groove 45 and having lateral faces which are bonded against seals.

The sealing element may instead be formed of two seals placed at the two respective ends 21 and 31 of the pipes, which are intended to be pressed against each other once the sleeve has been screwed on, after the ends 21 and 31 have been provided with the end-pieces. These seals would then be fitted onto the ends 21 and 31 during welding of the end-pieces.

The principle of the method of coupling two pipes by way of the invention will now be explained. The end-pieces 11 and 12 are first fitted around the respective ends 21 and 31 of the two pipes. For this purpose, the internal walls of each end-piece and the external walls of the ends of the pipes are heated. After the material has softened, the ends of the pipes are fitted into the end-pieces and cooled to ensure subsequent consolidation of the components. The sealing element 44, such as a semi-rigid seal, is then placed in the groove 45 of the sleeve.

Finally, the ends 21 and 31 of the pipes, provided with the end-pieces, are laid on a cradle in order to ensure their alignment, and they are brought into contact with each of the ends of the sleeve 40, and the sleeve is rotated in a given direction. Since the screw threads 48 and 49 are of opposite hand, the screwing onto the two pipes takes place simultaneously. Of course, the tightening torque must be sufficient to deform the seal so that it intimately follows the shape of the free cross sections of the ends 21 and 31 of the pipes so as to ensure that the coupling is perfectly leak-tight. When the operation is complete, the ends of the pipes are tightly pressed against the lateral faces of the seal 44 in order to guarantee leak-tightness.

Obviously, numerous modifications and variations of the present invention are possible in light of the above teachings. It is therefore to be understood that the invention may be practiced otherwise than as specifically described herein.

What is claimed is:

1. A device for coupling two pipes made of composite material based on a reinforced thermoplastic, the device comprising:
    a first end-piece fastenable to an end of a first pipe;
    a second end-piece fastenable to an end of a second pipe, each of said first and second end-pieces having a screw thread over at least part of its external surface;
    a sleeve having at least one internal screw thread which is matable with the external screw thread of at least one of said end-pieces, so that said at least one of said end-pieces can be threaded into said sleeve; and
    a sealing element fittable in said sleeve and abutting the end of said at least one of said end-pieces when the at least one of said end-pieces is threaded into said sleeve,
    wherein the first and second pipes are each made from a thermoplastic matrix, a layer of reinforced material coating the matrix, and a thermoplastic jacket covering the coating layer, wherein at least internal surfaces of the end-pieces are made of a same thermoplastic as that of the jacket of the pipes, and wherein the end-pieces are respectively heat welded around ends of the first and second pipes.

2. The device according to claim 1, wherein the screw thread of the sleeve is formed from the same material as that of the screw threads of the end-pieces.

3. The device according to claim 1, wherein the sealing element is sufficiently flexible to intimately follow the shape of the free cross sections of the ends of the pipes.

4. An assembly comprising:
    first and second pipes made of composite material based on a reinforced thermoplastic;
    a first end-piece fastened to an end of a first pipe;
    a second end-piece fastened to an end of a second pipe, each of said first and second end-pieces having a screw thread over at least part of its external surface;
    a sleeve having at least one internal screw thread which is mated with the external screw thread of at least one of said end-pieces, so that said at least one of said end-pieces is threaded into said sleeve; and
    a sealing element fitted in said sleeve and abutting the end of said at least one of said end-pieces,
    wherein the first and second pipes are each made from a thermoplastic matrix, a layer of reinforced material coating the matrix, and a thermoplastic jacket covering the coating layer, wherein at least internal surfaces of the end-pieces are made of a same thermoplastic as that of the jacket of the pipes, and wherein the end-pieces are respectively heat welded around ends of the first and second pipes.

5. The assembly according to claim 4, wherein the length of the end-pieces is between 0.5 and 2 times the diameter of the pipes, which are of cylindrical shape.

6. A device for coupling two pipes made of composite material based on a reinforced thermoplastic, the device comprising:
    a first end-piece fastenable to an end of a first pipe;
    a second end-piece fastenable to an end of a second pipe, each of said first and second end-pieces having a screw thread over at least part of its external surface;
    a sleeve having two internal screw threads which are matable with the external screw threads of said end-pieces, so that said end-pieces can be threaded into said sleeve, said internal screw threads having opposite threaded engaging directions and being located on either side of a mid-plane transverse to the longitudinal axis of the sleeve; and
    a sealing element fittable in said sleeve and abutting the ends of said end-pieces when said end-pieces are threaded into said sleeve,
    wherein the first and second pipes are each made from a thermoplastic matrix, a layer of reinforced material coating the matrix, and a thermoplastic jacket covering the coating layer, wherein at least internal surfaces of the end-pieces are made of a same thermoplastic as that of the jacket of the pipes, and wherein the end-pieces are respectively heat welded around ends of the first and second pipes.

7. The device according to claim 6, wherein the sleeve includes, at the mid-plane, a groove configured to accommodate the sealing element.

8. The device according to claim 6, wherein the screw threads of the sleeve are formed from the same material as that of the screw threads of the end-pieces.

9. A device for coupling two pipes made of composite material based on a reinforced thermoplastic, the device comprising:
    a first end-piece fastenable to an end of a first pipe;
    a second end-piece fastenable to an end of a second pipe, each of said first and second end-pieces having a screw thread over at least part of its external surface;
    a sleeve having two internal screw threads which are matable with the external screw threads of said end-pieces, so that said end-pieces can be threaded into said sleeve, said internal screw threads having opposite threaded engaging directions and being located on either side of a mid-plane transverse to the longitudinal axis of the sleeve;
    a sealing element fittable in said sleeve and abutting the ends of said end-pieces when said end-pieces are threaded into said sleeve; and
    indicia provided on the end-pieces and on the sleeve for identifying the hand of the screw thread thereon.

10. An assembly comprising:
    first and second pipes made of composite material based on a reinforced thermoplastic;
    a first end-piece fastened to an end of a first pipe;
    a second end-piece fastened to an end of a second pipe, each of said first and second end-pieces having a screw thread over at least part of its external surface;
    a sleeve having at least one internal screw thread which is mated with the external screw thread of at least one of said end-pieces, so that said at least one of said end-pieces is threaded into said sleeve; and
    a sealing element fitted in said sleeve and abutting the end of said at least one of said end-pieces,
    wherein the sleeve includes an external coating layer whose material is identical to that of an external coating layer of pipes, the material comprising co-mingled glass filaments and thermoplastic filaments.

11. The assembly according to claim 10, wherein the thickness of the external coating layer of the sleeve is at least equal to that of the coating layer of the pipes.

12. A device for coupling two pipes made of composite material based on a reinforced thermoplastic, the device comprising:

a first end-piece fastenable to an end of a first pipe;

a second end-piece fastenable to an end of a second pipe, each of said first and second end-pieces having a screw thread over at least part of its external surface;

a sleeve having at least one internal screw thread which is matable with the external screw thread of at least one of said end-pieces, so that said at least one of said end-pieces can be threaded into said sleeve; and sealing means fittable in said sleeve and abutting the end of said at least one of said end-pieces when the at least one of said end-pieces is threaded into said sleeve, wherein the first and second pipes are each made from a thermoplastic matrix, a layer of reinforced material coating the matrix, and a thermoplastic jacket covering the coating layer, wherein at least internal surfaces of the end-pieces are made of a same thermoplastic as that of the jacket of the pipes, and wherein the end-pieces are respectively heat welded around ends of the first and second pipes.

13. An assembly comprising:

first and second pipes made of composite material based on a reinforced thermoplastic;

a first end-piece fastened to an end of a first pipe;

a second end-piece fastened to an end of a second pipe, each of said first and second end-pieces having a screw thread over at least part of its external surface;

a sleeve having at least one internal screw thread which is mated with the external screw thread of at least one of said end-pieces, so that said at least one of said end-pieces is threaded into said sleeve; and sealing means fitted in said sleeve and abutting the end of said at least one of said end-pieces, wherein the first and second pipes are each made from a thermoplastic matrix, a layer of reinforced material coating the matrix, and a thermoplastic jacket covering the coating layer, wherein at least internal surfaces of the end-pieces are made of a same thermoplastic as that of the jacket of the pipes, and wherein the end-pieces are respectively heat welded around ends of the first and second pipes.

14. The assembly according to claim 13, wherein the sleeve includes an external coating layer whose material is identical to that of an external coating layer of pipes, the material comprising co-mingled glass filaments and thermoplastic filaments.

15. An assembly comprising:

first and second pipes made of composite material based on a reinforced thermoplastic;

a first end-piece fastened to an end of a first pipe;

a second end-piece fastened to an end of a second pipe, each of said first and second end-pieces having a screw thread over at least part of its external surface;

a sleeve having at least one internal screw thread which is mated with the external screw thread of at least one of said end-pieces, so that said at least one of said end-pieces is threaded into said sleeve; and a sealing element fitted in said sleeve and abutting the end of said at least one of said end-pieces, wherein the sleeve includes an external coating layer and the pipes include an external coating layer, and wherein the thickness of the external coating layer of the sleeve is at least equal to that of the coating layer of the pipes.

16. An assembly comprising:

first and second pipes made of composite material based on a reinforced thermoplastic;

a first end-piece fastened to an end of a first pipe;

a second end-piece fastened to an end of a second pipe, each of said first and second end-pieces having a screw thread over at least part of its external surface;

a sleeve having at least one internal screw thread which is mated with the external screw thread of at least one of said end-pieces, so that said at least one of said end-pieces is threaded into said sleeve; and sealing means fitted in said sleeve and abutting the end of said at least one of said end-pieces, wherein the sleeve includes an external coating layer and the pipes include an external coating layer, and wherein the thickness of the external coating layer of the sleeve is at least equal to that of the coating layer of the pipes.

* * * * *